(12) United States Patent
Macchietto et al.

(10) Patent No.: US 9,470,288 B2
(45) Date of Patent: Oct. 18, 2016

(54) VIBRATION MITIGATION DEVICE

(71) Applicant: Valmont Industries, Inc., Omaha, NE (US)

(72) Inventors: Carl J. Macchietto, Omaha, NE (US); Richard E. Christenson, Mansfield Center, CT (US); Darren E. Ingram, Omaha, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 0 days.

(21) Appl. No.: 14/487,022

(22) Filed: Sep. 15, 2014

(65) Prior Publication Data

US 2015/0075932 A1 Mar. 19, 2015

Related U.S. Application Data

(60) Provisional application No. 61/878,016, filed on Sep. 15, 2013.

(51) Int. Cl.
*F16F 7/116* (2006.01)
*F16F 15/03* (2006.01)

(52) U.S. Cl.
CPC .............. *F16F 15/035* (2013.01); *F16F 7/116* (2013.01)

(58) Field of Classification Search
CPC ........ F16F 15/03; F16F 15/035; F16F 7/104; F16F 7/116

USPC .......................... 188/379, 380; 267/136, 137
See application file for complete search history.

(56) References Cited

U.S. PATENT DOCUMENTS

| | | | | |
|---|---|---|---|---|
| 2,854,100 A | * | 9/1958 | Oiley et al. | 188/379 |
| 2,887,071 A | * | 5/1959 | Settles | 188/379 |
| 5,570,286 A | * | 10/1996 | Margolis et al. | 701/36 |
| 6,009,985 A | * | 1/2000 | Ivers | 188/380 |
| 7,681,701 B2 | * | 3/2010 | Mikonaho | 188/380 |
| 8,584,816 B2 | * | 11/2013 | Brewen et al. | 188/267 |
| 2004/0226788 A1 | * | 11/2004 | Tanner | 188/267.1 |
| 2010/0101906 A1 | * | 4/2010 | Herold et al. | 188/379 |

FOREIGN PATENT DOCUMENTS

| | | | | |
|---|---|---|---|---|
| GB | 468365 A | * | 6/1937 | |
| GB | 784387 A | * | 10/1957 | |
| GB | 1367285 A | * | 9/1974 | |

* cited by examiner

*Primary Examiner* — Thomas J Williams
(74) *Attorney, Agent, or Firm* — David H. Milligan PC LLO

(57) ABSTRACT

A vibration mitigation device configured to be fixedly coupled to a generally horizontally extending support member. The vibration mitigation device includes a generally vertically extending housing extending from the generally horizontally extending support member and a reciprocating assembly coupled with and fully enclosed inside of the generally vertically extending housing.

12 Claims, 7 Drawing Sheets

US 9,470,288 B2

VIBRATION MITIGATION DEVICE

RELATED APPLICATIONS

The present application claims priority to U.S. Provisional Patent Application No. 61/878,016.

BACKGROUND OF THE DISCLOSURE

1. Technical Field of the Disclosure

The present invention is related in general to vibration mitigation systems, and in particular to a vibration mitigation device that incorporates a reciprocating assembly connected with a biasing member to mitigate vibration.

2. Description of the Related Art

Traffic signals are used extensively all over the world to control conflicting flows of traffic. The traffic signals are attached to tall traffic signal poles and horizontally extending mast arms or cables to ensure clear visibility of traffic signals for the drivers or pedestrians. Various types of signal support structures are currently employed, of which cantilevered support structures are widely used as traffic signal support structures since they consist of less material with only one vertical pole. However, cantilevered structures are flexible, lightly-damped structures that are highly susceptible to wind-induced vibration. The sustained large amplitude deflections due to excessive wind-induced vibrations can result in fatigue failure of the mast arm and vertical pole connection. This fatigue failure will ultimately lead to failure of these structures and represents a significant cost to signal owners.

Reducing the effective stress range in the structure by reducing the amplitude of the vibration can significantly increase the life of that structure. This can be done by increasing the damping of the structure with an effective damping device that would decrease the amplitude and number of cycles, thus extending the service life of the structure. A number of different methods have been suggested to increase the damping of the structure and reduce the excessive wind induced vibration of traffic poles. One such method employs a Signal Head Vibration Absorber (SHVA), which is a promising type of vibration absorber for traffic signal support structures. This device has been experimentally shown to increase the critical damping ratio of the traffic signal structures from less than 1% to over 10%, virtually eliminating any vibration, and protecting the structure from fatigue damage.

In a known prior art related to the vibration dampening systems, the damping assembly employs multiple doughnut shaped metal discs or weights vertically and loosely arranged in a unique fashion about a rod, disposed in a housing within the pole to reduce vibrations. However, the damper requires larger diameter poles which in turn would result in an over-sized support structure. Additionally, this class of damper, based on friction and/or impact damping, is amplitude dependent and may not be effective over certain ranges of vibration amplitudes.

Recent advancements in the art provide a vibration absorber, the SHVA noted above, for traffic signal supports. The SHVA utilizes the mass of the signal head in a configuration as a damped vibration absorber. The system also includes a spring and damper in mechanical communication with the signal head. However, the downside to this system is that the absorber requires utilization of the mass of the traffic signal which itself plays a critical function and the SHVA unit contains components exposed to the elements which requires regular maintenance.

Based on the foregoing there is a need for a vibration mitigation device which utilizes viscous or velocity dependent damping for energy dissipation, eliminates the utilization of the mass of the traffic signal and is self-contained with all critical components protected from the elements. Such a needed device would comprise a reciprocating assembly connected to a biasing member. The device would utilize a tension spring or a compression spring in an eddy current dampening process and/or a pneumatic process to dissipate energy and reduce vibrations. The present invention overcomes prior art shortcomings by accomplishing these critical objectives.

SUMMARY OF THE DISCLOSURE

To minimize the limitations found in the prior art, and to minimize other limitations that will be apparent upon the reading of the specification, the preferred embodiment of the present invention provides a vibration mitigation device which uses viscous or velocity dependent damping to dissipate energy, eliminates the utilization of the mass of the traffic signal and is self-contained with all critical components protected from the elements.

The present invention discloses a vibration mitigation device configured to be fixedly coupled to a generally horizontally extending support member. The vibration mitigation device includes a generally vertically extending housing extending from the generally horizontally extending support member and a reciprocating assembly coupled with and fully enclosed inside of the generally vertically extending housing. According to a first preferred embodiment, the reciprocating assembly includes a pair of opposing conducting rods disposed along a longitudinal path with respect to the generally vertically extending housing, a mass fixedly connected with a plurality of magnets arranged to provide a magnetic field across the pair of opposing conducting rods and configured to translate along the vertical path with respect to the generally vertically extending housing, a plurality of securing guides coupled with the mass and configured to allow the mass to reciprocate relative to the conducting rods and the vertically extending housing, and a biasing member configured to couple the reciprocating assembly with the generally vertically extending housing and configured to support the plurality of magnets and the mass in a neutral position with respect to the generally vertically extending housing when the vibration mitigation device is at rest. According to an alternative embodiment, the entirety or a portion of the housing itself may be used as the conducting material and the conducting rods may be eliminated.

In accordance with one embodiment of the present invention, the vibration mitigation device utilizes a tension spring as the biasing member in an eddy current dampening process. In this embodiment, the vibration mitigation device functions as an eddy current dampening device by generating eddy current when the conducting material is moved within the magnetic field of the device. In this embodiment, the conducting material is preferably disposed along the longitudinal path travelled by the mass and the plurality of magnets. Preferably, the pair of opposing conducting rods is configured with the plurality of magnets in such a way that the plurality of magnets move up and down relative to the pair of opposing conducting rods. In this configuration, the plurality of magnets dissipates the energy in the vibration mitigation device, resulting in motion dampening of the vibrating system.

In accordance with another exemplary embodiment of the present invention, the vibration mitigation device utilizes a tension spring as the biasing member in a pneumatic process. In this configuration, the vibration mitigation device includes a sealed outer case, an upper air chamber, the tension spring, a mass and a lower air chamber. The mass includes a pair of bushings that provides a contact surface for guiding the mass by the sealed outer case. The sealed outer case is pneumatically sealed and the mass is suspended by the tension spring and reciprocates vertically along the upper air chamber and the lower air chamber. During excessive vibrations in the support structure, the mass moves up and down in the sealed outer case, resulting in the exchange of air from one side of the mass to the other. This creates a suction or airflow resistance in the upper air chamber or lower air chamber, which slows the mass and dampens the vibration. In one embodiment, the mass includes side and/or interior relief conduits that allow air to communicate between the upper air chamber and the lower air chamber.

In accordance with yet another exemplary embodiment of the present invention, the vibration mitigation device utilizes a tension spring as the biasing member while operating in both the pneumatic process and the eddy current dampening process. This hybrid embodiment may work better over a wide spectrum of vibration amplitudes. For low amplitude, the eddy current dampening process may provide improved vibration mitigation results and for higher amplitudes, the pneumatic process may provide improved vibration mitigation results. Other exemplary embodiments provide a vibration damping element that utilizes a compression spring as a biasing member for mitigating vibrations. Further exemplary embodiments provide a vibration damping element that utilizes a compression spring and a tension spring as biasing members for mitigating vibrations.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
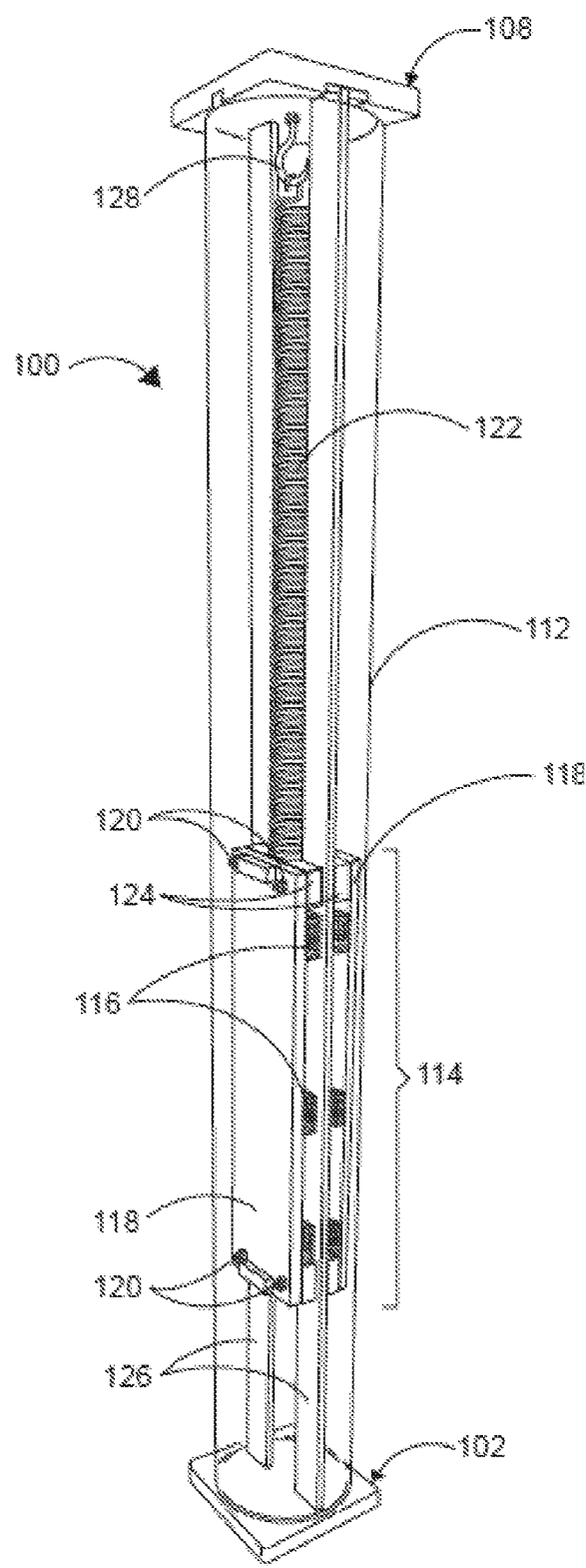
FIG. 1 is a perspective view of a preferred embodiment of a vibration mitigation device of the present invention.

FIG. 1 is a perspective view of a preferred embodiment of a vibration mitigation device 100 of the present invention. The vibration mitigation device 100 is configured to be fixedly coupled to a generally horizontally extending support member (not shown). The device 100 includes a generally vertically extending housing 112 with a second end cap 102, a first end cap 108, a pair of opposing conducting rods 126 disposed along a vertical path with respect to the generally vertically extending housing 112 and a reciprocating assembly 114 reciprocatingly coupled with the generally vertically extending housing 112.

The reciprocating assembly 114 as shown preferably includes a mass 118 and a plurality of magnets 116 connected to the mass 118. The magnets 116 are preferable configured to translate along a vertical path with respect to the generally vertically extending housing 112 and to thereby provide a magnetic field across the conducting rods 126. As shown, the reciprocating assembly preferably further includes a plurality of guides 124 coupled with the mass 118 by at least one fastening element 120 and configured to allow the mass 118 to translate reciprocatingly by the pair of opposing conducting rods 126. As further shown, the vertically extending housing 112 and a biasing member 122 are coupled to the reciprocating assembly 114. The vertically extending housing 112 includes a first end cap 108 which connects to the biasing member 122 via a connecting element 128. Preferably, the biasing member 122 is configured to support the plurality of magnets 116 and the mass 118 in a neutral position with respect to the generally vertically extending housing 112 when the vibration mitigation device 100 is at rest. The biasing member 122 includes at least one tension spring or a compression spring. The end caps 102 and 108 are preferably of unitary construction.

Figure 2:
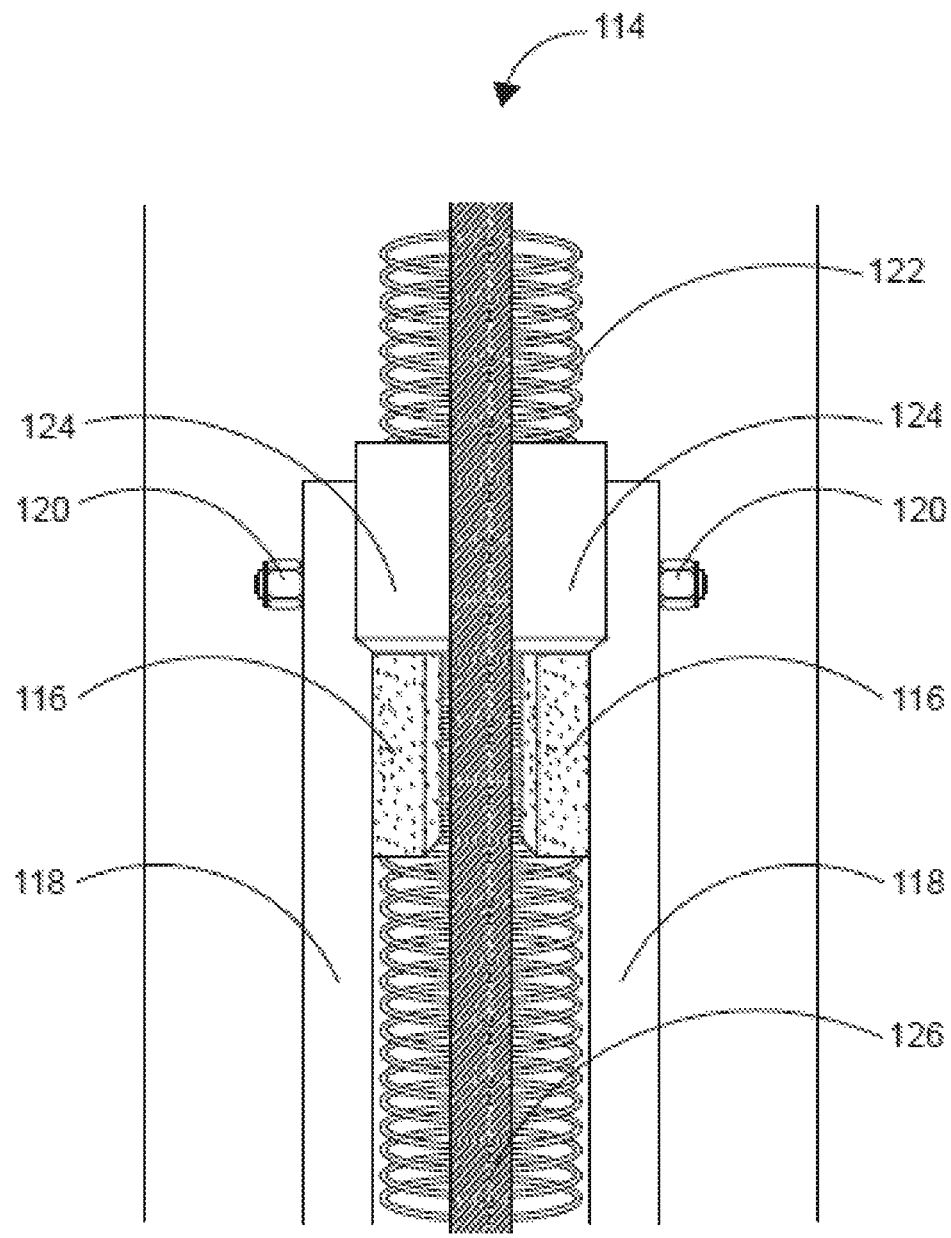
FIG. 2 is an enlarged view of a reciprocating assembly incorporated within the vibration mitigation device of the present invention.

With reference now to FIG. 2, an enlarged view of the reciprocating assembly 114 incorporated within the vibration mitigation device 100 of the present invention is illustrated. In one embodiment, the vibration mitigation device 100 utilizes a tension spring as the biasing member 122 in an eddy current dampening process. In this embodiment, the vibration mitigation device 100 functions as an eddy current dampening device by generating eddy current when the pair of opposing conducting rods 126 is moved within the magnetic field of the device 100. At rest, the mass 118 is suspended on the biasing member 122 within the generally vertically extending housing 112. When vibrational force is applied, the mass 118 reciprocates up and down within the generally vertically extending housing 112.

According to a further aspect of the first preferred embodiment, the pair of opposing conducting rods 126 are preferably formed of conducting material and placed along the vertical path travelled by the mass 118 and the plurality of magnets 116. Preferably, the pair of opposing conducting rods 126 are secured within the vertically extending housing 112 in such a way that the plurality of magnets 116 moves up and down relative to and provides a magnetic field across the pair of opposing conducting rods 126. In this process, the plurality of magnets 116 create eddy currents in the conducting material which dissipates the energy of the vibration mitigation device 100, resulting in motion dampening of the support member. The conducting material of conducting rods 126 may preferably be formed from any non-ferrous metal(s). For example, in one embodiment, the conducting material may include aluminum, copper, gold, silver or a combination thereof. The plurality of magnets 116 may include a permanent magnetic material, a ferromagnetic material, a ferromagnetic material or an electromagnet. The plurality of guides 124 are preferably coupled with the mass 118 by at least one fastening element 120.

In one embodiment, the eddy current dampening device generates electricity, which is sufficient to run an LED light.

Figure 3:
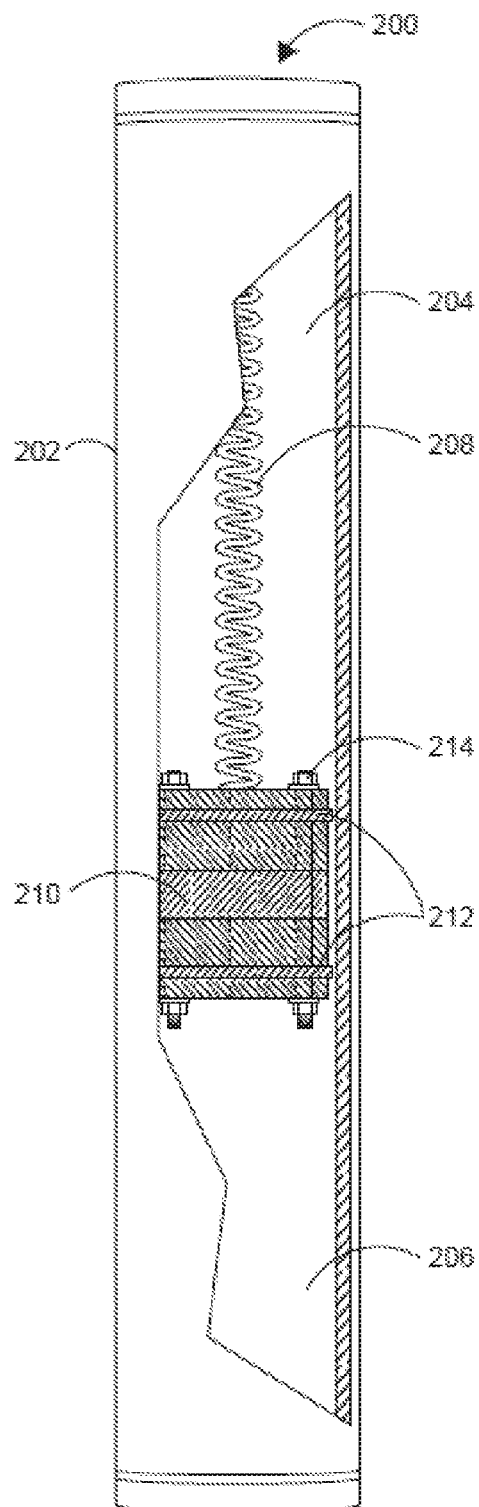
FIG. 3 is a partially cut-away schematic diagram of an exemplary vibration mitigation device of one embodiment of the present invention.
Figure 4:
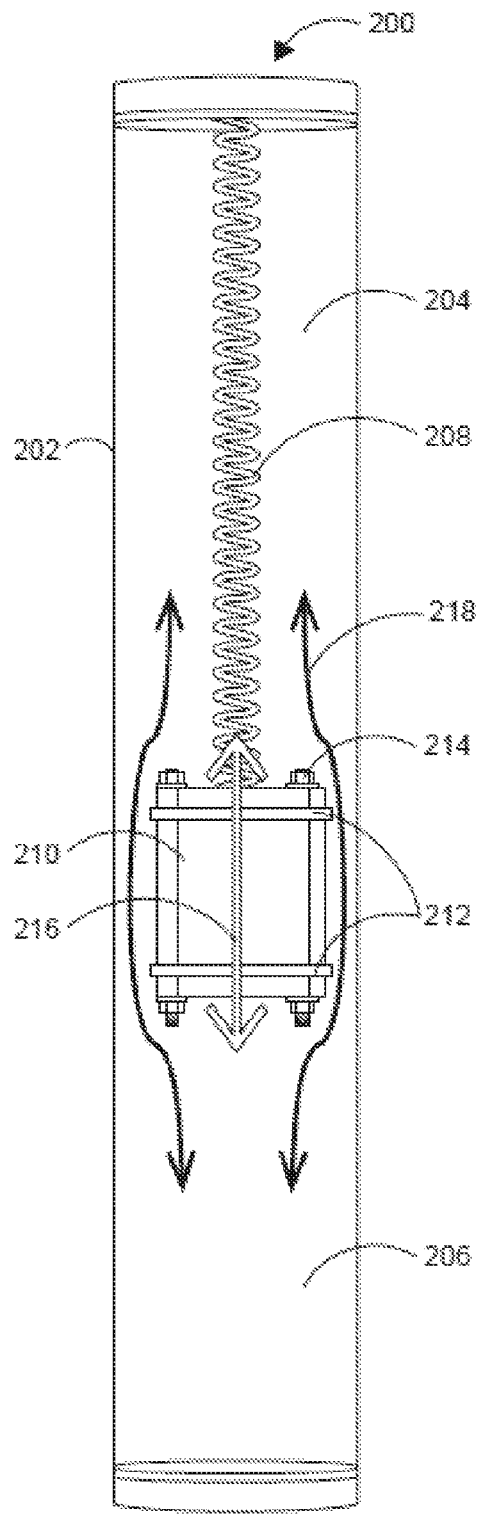
FIG. 4 is a schematic diagram of the vibration mitigation device shown in FIG. 3, illustrating flow of air between an upper air chamber and a lower air chamber.

In an alternative exemplary embodiment of the present invention, as shown in FIGS. 3 and 4, a vibration mitigation device 200 utilizes a tension spring 208 as the biasing member in a pneumatic process. The vibration mitigation device 200 includes a sealed outer case 202, an upper air chamber 204, a tension spring 208, a mass 210 and a lower air chamber 206. The mass 210 includes a pair of bushings 212 that provide a contact surface for guiding the mass 210 within the sealed outer case 202. In one embodiment, the mass 210 includes a plurality of stacked weights that are stacked together by at least one fastening element 214. The at least one fastening element 214 may include nuts and bolts.

The sealed outer case 202 is preferably pneumatically sealed and the mass 210 is suspended by the tension spring 208 and allowed to reciprocate vertically. During excessive vibrations in the support structures, the mass 210 is preferably configured to move up and down in the sealed outer case 202 resulting in exchange of air from one side of the mass 210 to the other. This creates a suction or airflow resistance in the upper air chamber 204 or lower air chamber 206 to slow the mass 210 and dampen the vibration. In one embodiment, the mass 210 includes side and/or interior relief conduits that allow air to communicate between the upper air chamber 204 and the lower air chamber 206.

FIG. 4 is a schematic diagram of the vibration mitigation device 200 shown in FIG. 3, illustrating a flow of air between the upper air chamber 204 and the lower air chamber 206. As shown, the motion of the mass 210 suspended by the tension spring 208 is excited through the motion of the mass arm that the device 200 is attached to and is indicated by the arrow 216. As further shown in FIG. 4, as the mass 210 travels up and down inside the sealed outer case 202, the volume of air between the upper air chamber 204 and the lower air chamber 206 changes. Specifically, as the mass 210 strokes downward, volume of the lower air chamber 206 decreases and the upper air chamber 204 increases. As volume of the lower air chamber 206 decreases, pressure increases, causing a resistance resulting in an upward damping force on the mass 210. Conversely, as the mass 210 strokes upward, the volume in the lower air chamber 206 increases and the volume of the upper air chamber 204 decreases. When the volume of the lower air chamber 206 increases, the pressure decreases, resulting in a damping force opposing the motion of the mass 210. The exchange of volume between the upper air chamber 204 and the lower air chamber 206 is indicated by the arrow 218. The amount of air exchanged may be adjusted by various elements including but not limited to: orifice plates drilled through the mass, valves and internal clearances.

Figure 5:
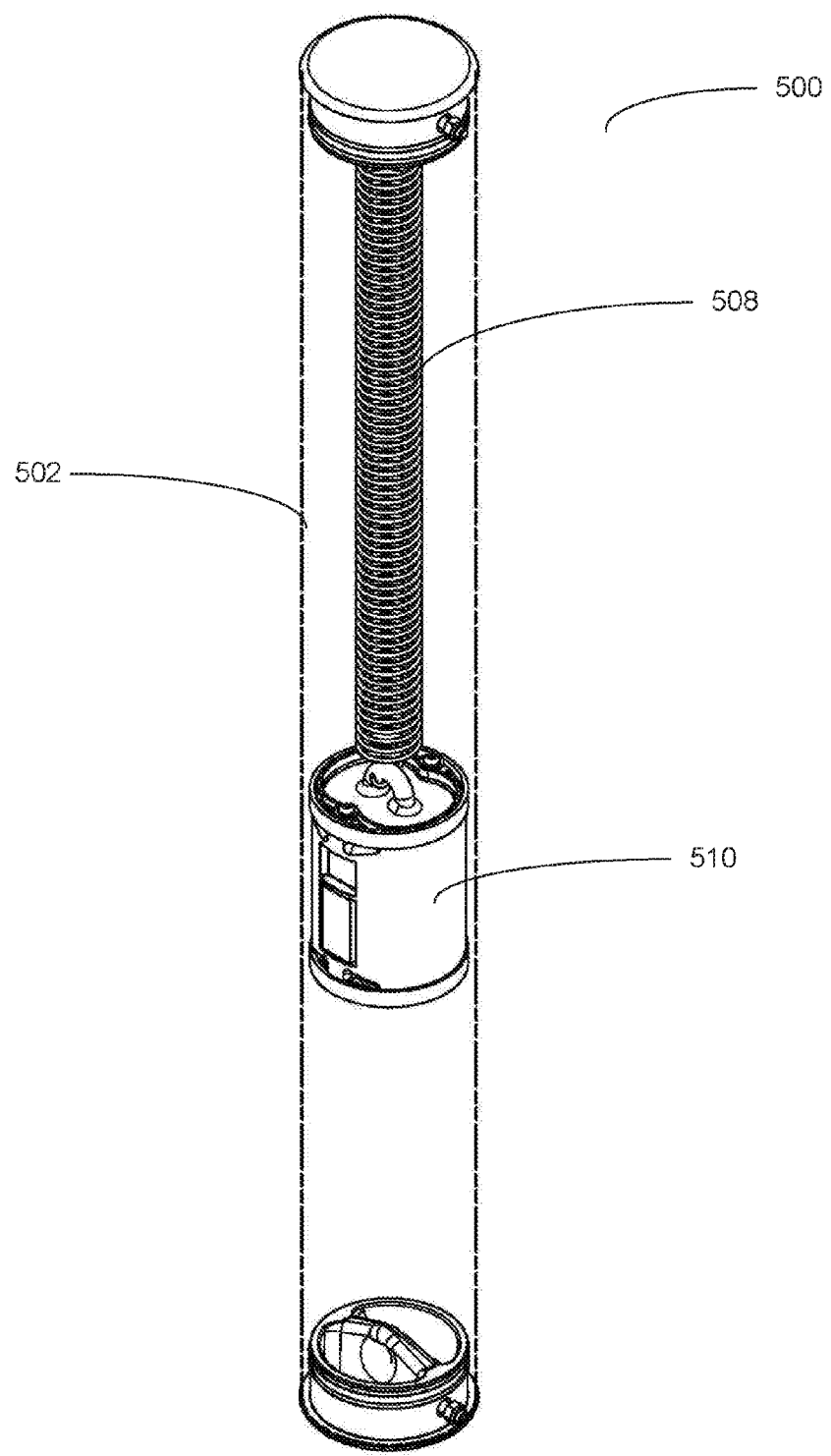
FIG. 5 is a perspective view of a preferred alternative embodiment of a vibration mitigation device of the present invention.

FIG. 5 is a perspective view of a preferred alternative embodiment of a vibration mitigation device 500 of the present invention. As shown, the vibration mitigation device 500 includes a generally vertically extending housing 502, a reciprocating assembly 510 arranged for reciprocating movement within the housing 502 and spring 508. According to a preferred embodiment, the spring 508 may be a tension spring, a compression spring or the like.

Figure 6:
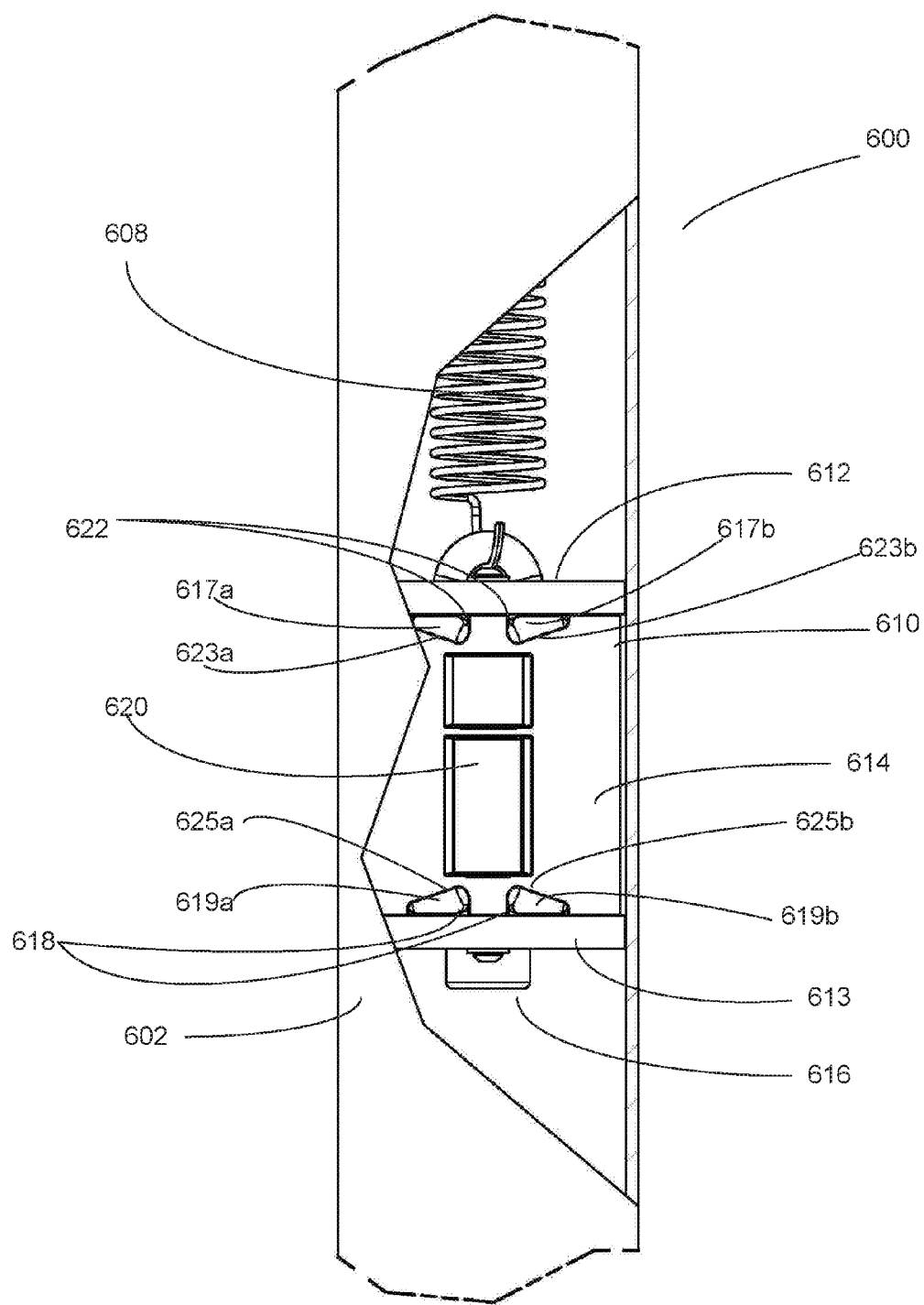
FIG. 6 is an enlarged view of a reciprocating assembly incorporated within a preferred alternative embodiment of a vibration mitigation device of the present invention.
Figure 7:
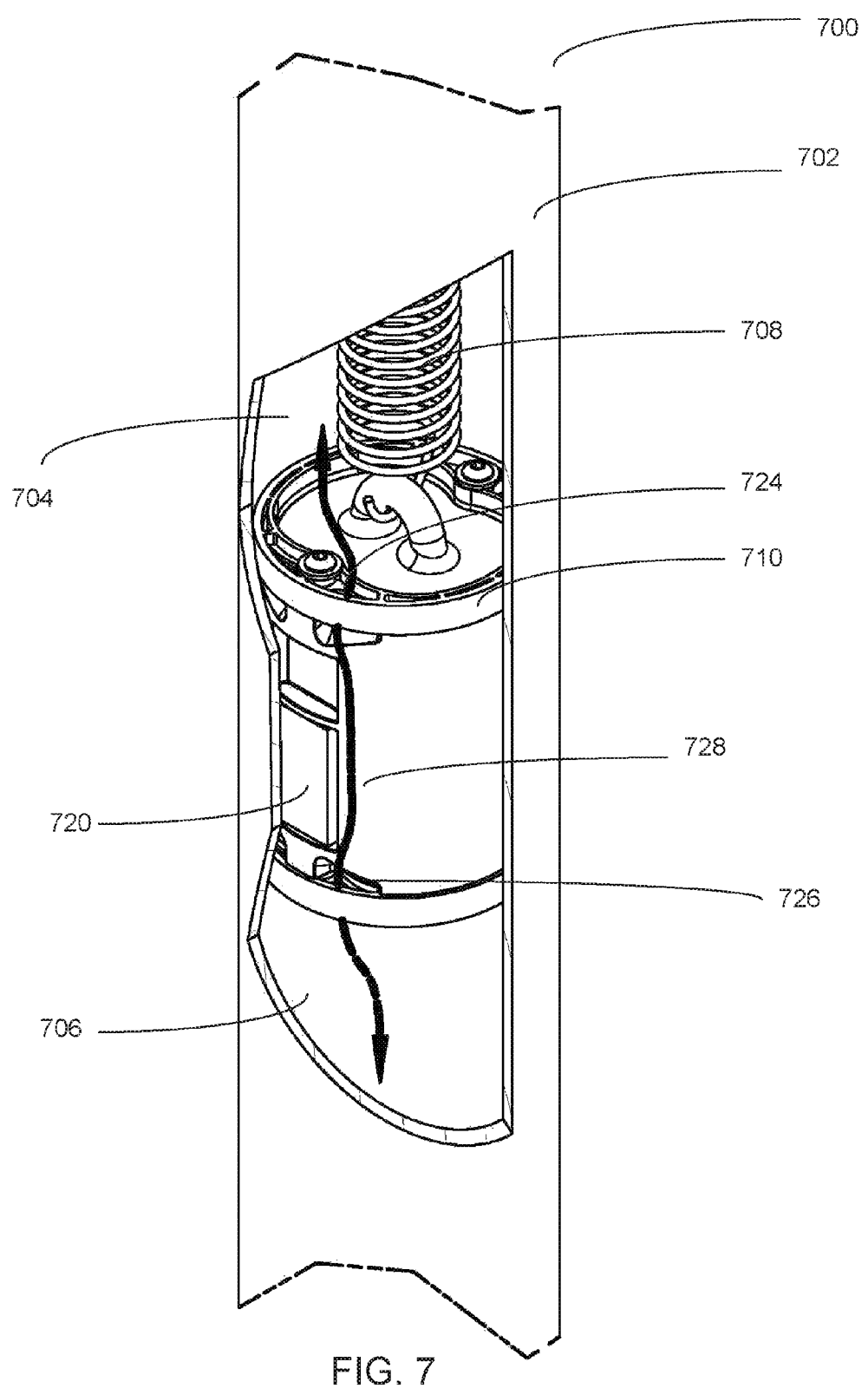
FIG. 7 is a schematic diagram of the vibration mitigation device shown in FIG. 6, illustrating flow of air between an upper air chamber and a lower air chamber.

With reference now to FIGS. 6 and 7, a detailed explanation of an alternative preferred embodiment as shown in FIG. 5 shall now be discussed. As shown in FIG. 6, a cut-way view is provided illustrating the interiors of the vertical housing assembly 602 (referred to as 502 in FIG. 5) and the reciprocating assembly 610 (referred to as 510 in FIG. 5). As shown, the vibration mitigation device 600 may preferably include a tension spring 608 as the biasing member in a pneumatic process, with the tension spring 608 attached to reciprocating mass assembly 610. As further shown, the reciprocating assembly 610 may be constructed as a cast iron weight 614 sealed within the reciprocating assembly 610 and may further include an upper slide bearing 612 and a lower slide bearing 613 to guide the movement of the reciprocating assembly 610. To assist and control air flow within the vertical housing assembly 602, the reciprocating assembly 610 may further include upper pneumatic air passages 622 and lower pneumatic air passages 618. Additionally, the reciprocating assembly 610 as shown may preferably further include a cushioning element 616 as well as a magnet element 620. According to a further preferred embodiment, magnet element 620 may be a rare earth magnet and cushioning element 616 may be a rubber bumper or the like.

As further shown in FIG. 6, the top slide bearing 612 further includes upper pneumatic passage wings 617a and 617b which extend downward from the top slide bearing 612 to form slanted top surfaces 623a and 623b. Similarly, the bottom slide bearing 613 includes lower pneumatic passage wings 619a and 619b which extend upward from the bottom of slide bearing 613 to form slanted top surfaces 625a and 625b.

FIG. 7 is a schematic diagram of the vibration mitigation device shown in FIG. 6. As shown, FIG. 7 illustrates the flow of air between the upper pneumatic air passages 724 and the lower pneumatic air passages 726. As discussed above with respect to other embodiments, the motion of the reciprocating assembly 710 suspended by the tension spring 708 is excited through the motion of the mass arm that the device 700 is attached to (not shown). As discussed above, in response to vibrational forces, the reciprocating assembly 710 travels up and down inside the sealed outer case 702 which results in a change in volume between the upper air chamber 704 and the lower air chamber 706. Specifically, as the reciprocating assembly 710 strokes downward, the volume of the lower air chamber 706 decreases and the volume the upper air chamber 704 increases. As the air volume of the lower air chamber 706 decreases, the pressure increases, causing a resistance resulting in an upward damping force on the reciprocating assembly 710. Conversely, as the reciprocating assembly 710 strokes upward, the volume of the lower air chamber 706 increases and the volume of upper air chamber 704 decreases. When the volume of the lower air chamber 706 increases, the pressure decreases, resulting in a damping force opposing the motion of the reciprocating assembly 710.

As detailed in FIG. 7, according to an alternative preferred embodiment, the exchange of volume between the upper air chamber 704 and the lower air chamber 706 is preferably directed through the upper pneumatic air passages 724 and the lower pneumatic air passages 726 as indicated by the arrow 728. The amount of air exchanged may be adjusted by various elements including but not limited to: orifice plates drilled through the mass, valves and internal clearances.

As further shown in FIG. 7, the reciprocating assembly 710 preferably further includes a magnet element 720. As discussed above, magnet element 720 preferably creates eddy currents in surrounding conducting materials which dissipates the energy of the vibration mitigation device 700, resulting in motion dampening. Preferably, magnet element 720 is comprised of a rare earth magnet. Alternatively, magnet element 720 may be formed of any permanent magnetic material, ferromagnetic material, ferromagnetic material or an electromagnet.

According to a further aspect of the present invention, the conductive materials of the present invention may be incorporated into the structure of the sealed outer case 702. According to a preferred embodiment, the sealed outer case 702 may be lined with conductive material. Alternatively, the conductive material may be incorporated into the entirety of the wall structure of the sealed outer case 702 or only embedded within discrete section(s) of the sealed outer case 702.

In another exemplary embodiment of the present invention, a tension spring is utilized as the biasing member when the vibration mitigation device operates in both the pneumatic process and the eddy current dampening process as described above. This hybrid embodiment may work better over a wide spectrum of vibration amplitudes. For low amplitudes, the eddy current dampening process may provide improved vibration mitigation results and for higher amplitudes, the pneumatic process may provide improved vibration mitigation results. Other exemplary embodiments provide a vibration damping element that utilizes a compression spring as a biasing member for mitigating vibrations. Further exemplary embodiments provide a vibration damping element that utilizes a compression spring and a tension spring as biasing members for mitigating vibrations.

According to a further preferred embodiment, the present invention may use a hydraulic or other liquid based pressure source in place of the pneumatic (air) pressure source discussed above. Accordingly, hydraulic fluid, oil, water or another liquid may be used within the vibration dampening element to allow for pressure adjustments between the upper and lower chambers of the vertically extending housing as discussed above.

In one embodiment, the present invention includes a vibration mitigation device that can be configured to reduce naturally induced vibrations and attached to a variety of support structures including at least one of a bridged structure, a cantilever or a multi-pole support system holding or supporting lighting, traffic signals, street signs, signage, cameras or other devices.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. A vibration mitigation apparatus, wherein the vibration mitigation apparatus comprises:
   a vertically extending housing, wherein the vertically extending housing comprises:
      a first end cap;
      a second end cap; and
      a centrally enclosed area;
   a reciprocating assembly, wherein the reciprocating assembly is enclosed within the vertically extending housing and configured to move vertically within the vertically extending housing; wherein the reciprocating assembling comprises a top surface and a bottom surface;
   a top slide bearing, wherein the top slide bearing comprises a plurality of upper air passages; wherein the top slide bearing is comprised of a body extending around the outer circumference of the top surface of the reciprocating assembly; further wherein the plurality of upper air passages are formed within the top slide bearing and spaced around the outer circumference of the top surface of the reciprocating assembly;
   a bottom slide bearing, wherein the bottom slide bearing comprises a plurality of lower air passages; wherein the bottom slide bearing is comprised of a body extending around the outer circumference of the bottom surface of the reciprocating assembly; further wherein the plurality of lower air passages are formed within the bottom slide bearing and spaced around the outer circumference of the bottom surface of the reciprocating assembly; and
   a biasing member, wherein the biasing member is attached to the vertically extending housing and to the reciprocating assembly, wherein the biasing member is configured to support the mass in a neutral position with respect to the vertically extending housing when the vibration mitigation apparatus is at rest.

2. The apparatus of claim 1, wherein the reciprocating assembly comprises one or more weight elements which are configured to increase the weight of the reciprocating assembly.

3. The apparatus of claim 2, wherein the biasing element is comprised of a tension spring.

4. The apparatus of claim 3, wherein the biasing element is comprised of a compression spring.

5. A vibration mitigation apparatus, wherein the vibration mitigation apparatus comprises:
   a vertically extending housing, wherein the vertically extending housing comprises:
      a first end cap;
      a second end cap; and
      a centrally enclosed area;
   a reciprocating assembly, wherein the reciprocating assembly is enclosed within the vertically extending housing and configured to move vertically within the vertically extending housing; wherein the reciprocating assembling comprises a top surface and a bottom surface;
   a top slide bearing, wherein the top slide bearing comprises a plurality of upper air passages; wherein the top slide bearing is comprised of a body extending around the outer circumference of the top surface of the reciprocating assembly; further wherein the plurality of upper air passages are formed within the top slide bearing and spaced around the outer circumference of the top surface of the reciprocating assembly;

further wherein the top slide bearing further comprises an upper pneumatic passage wing; wherein the upper pneumatic passage wing extends downward from the top slide bearing to form a first slanted, distal surface; and a bottom slide bearing, wherein the bottom slide bearing comprises a plurality of lower air passages; wherein the bottom slide bearing is comprised of a body extending around the outer circumference of the bottom surface of the reciprocating assembly; further wherein the plurality of lower air passages are formed within the bottom slide bearing and spaced around the outer circumference of the bottom surface of the reciprocating assembly;

further wherein the bottom slide bearing comprises a lower pneumatic passage wing; wherein the lower pneumatic passage wing extends upward from bottom slide bearing to form a second slanted, distal surface; and a biasing member, wherein the biasing member is attached to the vertically extending housing and to the reciprocating assembly, wherein the biasing member is configured to support the mass in a neutral position with respect to the vertically extending housing when the vibration mitigation apparatus is at rest; and a magnetic element, wherein the magnetic element is attached to the reciprocating assembly and further wherein the magnetic element is configured to produce eddy currents as the reciprocating assembly moves vertically within the vertically extended housing.

6. The apparatus of claim 5, wherein the apparatus further comprises a conducting element.

7. The apparatus of claim 6, wherein the vertically extending housing further comprises at least one portion of the housing which is comprised of a conducting material.

8. The apparatus of claim 6, wherein the conducted element comprises a conducting rod.

9. The apparatus of claim 8, wherein the magnet element is comprised of a rare earth magnet.

10. The apparatus of claim 9, wherein the reciprocating assembly comprises one or more weight elements which are configured to increase the weight of the reciprocating assembly.

11. The apparatus of claim 10, wherein the biasing element is comprised of a tension spring.

12. The apparatus of claim 10, wherein the biasing element is comprised of a compression spring.

* * * * *